(12) United States Patent
Hwang et al.

(10) Patent No.: US 11,085,584 B2
(45) Date of Patent: Aug. 10, 2021

(54) HIGH-PRESSURE COMPOSITE CONTAINER HAVING GASTIGHT NOZZLE STRUCTURE

(71) Applicant: Hyundai Motor Company, Seoul (KR)

(72) Inventors: Ki Ho Hwang, Seoul (KR); Young Min Choi, Yongin-si (KR); Jae Han Chung, Incheon (KR)

(73) Assignee: Hyundai Motor Company, Seoul (KR)

( * ) Notice: Subject to any disclaimer, the term of this patent is extended or adjusted under 35 U.S.C. 154(b) by 557 days.

(21) Appl. No.: 15/341,660

(22) Filed: Nov. 2, 2016

(65) Prior Publication Data

US 2018/0003341 A1 Jan. 4, 2018

(30) Foreign Application Priority Data

Jun. 29, 2016 (KR) .................. 10-2016-0081262

(51) Int. Cl.
*F17C 1/16* (2006.01)
*F17C 13/00* (2006.01)
*F17C 13/04* (2006.01)

(52) U.S. Cl.
CPC ............... *F17C 1/16* (2013.01); *F17C 13/00* (2013.01); *F17C 13/04* (2013.01); *F17C 2203/0604* (2013.01); *F17C 2203/066* (2013.01); *F17C 2203/0619* (2013.01); *F17C 2203/0663* (2013.01); *F17C 2205/0305* (2013.01); *F17C 2205/0323* (2013.01); *F17C 2209/2118* (2013.01); *F17C 2221/012* (2013.01); *F17C 2221/033* (2013.01); *F17C 2260/036* (2013.01); *F17C 2260/037* (2013.01); *F17C 2270/0184* (2013.01); *Y02E 60/32* (2013.01)

(58) Field of Classification Search
CPC ........ F17C 2260/036; F17C 1/00; F17C 1/16; F17C 2205/03; F17C 2205/0323
USPC .................................................... 220/592, 601
See application file for complete search history.

(56) References Cited

U.S. PATENT DOCUMENTS

| 4,690,295 A * | 9/1987 | Wills ........................ F17C 1/16 |
| | | 220/203.08 |
| 6,089,399 A * | 7/2000 | Felbaum ............... B32B 15/013 |
| | | 220/582 |
| 6,230,922 B1 * | 5/2001 | Rasche .................... F17C 1/16 |
| | | 220/586 |
| 8,231,028 B2 | 7/2012 | Matsuoka et al. |
| 2008/0251520 A1 | 10/2008 | Ota et al. |
| 2010/0025411 A1 | 2/2010 | Otsubo et al. |

(Continued)

FOREIGN PATENT DOCUMENTS

| CN | 101382235 A | 3/2009 |
| CN | 101576163 A | 11/2009 |
| CN | 102182910 A | 9/2011 |

(Continued)

*Primary Examiner* — Anthony D Stashick
*Assistant Examiner* — Raven Collins
(74) *Attorney, Agent, or Firm* — Morgan, Lewis & Bockius LLP (57) ABSTRACT

A high-pressure composite container having a gastight nozzle structure includes a metal nozzle formed at a side of an inlet of a plastic liner layer that defines an inner layer of the high-pressure composite container; a nozzle insert which is inserted into and attached to the metal nozzle in a direction from an inner side of the plastic liner layer to an outer side of the plastic liner layer; and a nut member fixed to an upper end portion of the nozzle insert.

6 Claims, 5 Drawing Sheets

(56) References Cited

U.S. PATENT DOCUMENTS

| | | | | |
|---|---|---|---|---|
| 2012/0085085 A1* | 4/2012 | Wright | ................. | F01N 3/2066 60/295 |
| 2015/0166233 A1* | 6/2015 | Aoe | ....................... | B65D 53/02 206/524.3 |

FOREIGN PATENT DOCUMENTS

| | | |
|---|---|---|
| DE | 102006057422 B3 | 6/2008 |
| DE | 102009014057 A1 | 9/2010 |
| EP | 0203631 A2 | 12/1986 |
| JP | 8-219387 A | 8/1996 |
| JP | 10-332083 A | 12/1998 |
| JP | 2000-291887 A | 10/2000 |
| JP | 2014-84900 A | 5/2014 |
| JP | 2015-140830 A | 8/2015 |
| JP | 2015-203500 A | 11/2015 |
| KR | 10-0469636 B1 | 1/2005 |
| KR | 10-2013-0083340 A | 7/2013 |
| KR | 10-2014-0128038 A | 11/2014 |
| WO | 99/13263 A1 | 3/1999 |

* cited by examiner

HIGH-PRESSURE COMPOSITE CONTAINER HAVING GASTIGHT NOZZLE STRUCTURE

CROSS-REFERENCE TO RELATED APPLICATION

This application claims the benefit of priority to Korean Patent Application No. 10-2016-0081262, filed on Jun. 29, 2016 in the Korean Intellectual Property Office, the entirety of which is incorporated herein by reference.

TECHNICAL FIELD

The present disclosure relates to a high-pressure composite container having a gastight nozzle structure. More particularly, it relates to a high-pressure composite container in which gastightness between a metal nozzle and a plastic liner layer is ensured.

BACKGROUND

In general, automobiles that use natural gas or hydrogen as fuel include storage tanks for fuel gas compressed in the form of high-pressure gas. A composite container may be applied in order to increase gas storage density.

The composite container may include a liner layer which blocks permeation of the gas, and a composite layer which supports internal pressure of the container, and the liner layer therein may be made of metal or plastic. In particular, the liner layer may be formed of a plastic material because plastic liners have excellent durability and the manufacturing costs thereof may be reduced.

In a case in which a plastic liner layer is applied to the composite container, the plastic itself needs to have sufficient resistance against permeation of gas, and a portion where a valve is coupled to a container inlet needs to be configured with a metal boss (or metal nozzle) so as to maintain sufficient valve coupling strength and gastightness.

If gas leaks through a joint portion between the metal boss and the plastic liner layer, the plastic liner layer may be severely deformed or damaged, which may cause a dangerous accident.

Figure 9:
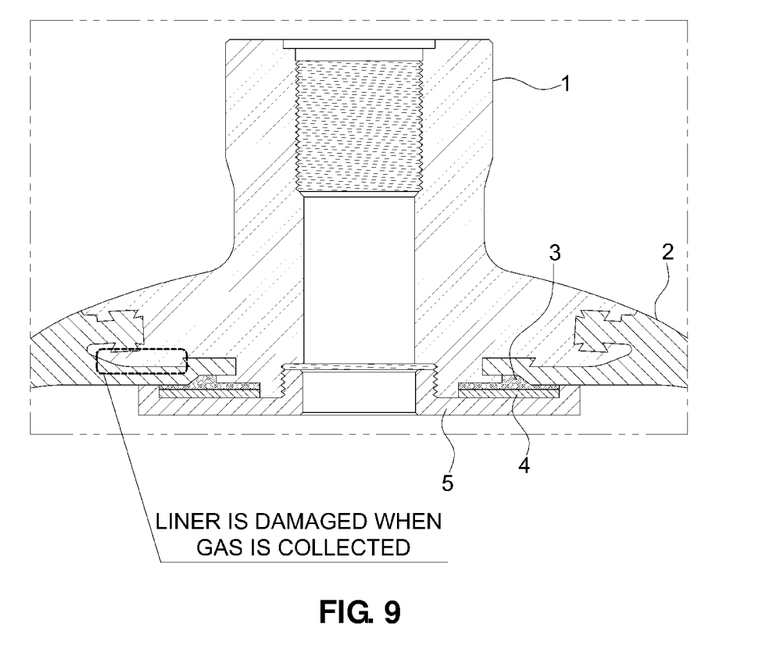
FIG. 9 is an exemplified view illustrating a high-pressure composite container in the related art.

FIG. 9 is an exemplified view illustrating a high-pressure composite material container according to the related art.

As illustrated in FIG. 9, the high-pressure composite container in the related art has a structure in which a plastic liner layer 2 is injection-molded with a metal nozzle 1 as an insert member, and a sealing pad 3 and a sealing plate 4 are stacked at a joint portion between the plastic liner layer 2 and the metal nozzle 1 and then fixed by means of a locking nut 5.

In the case of the high-pressure composite container in the related art, when internal pressure of the container is high, a large area of the locking nut 5 at a lower side of thereof is pressed by the sealing pad 3 such that gastightness may be maintained, but when internal pressure of the container is low, the pressure applied by the sealing pad 3 is decreased, and as a result, gas may leak through a joint portion between the sealing pad 3 and the plastic liner layer 2, and if the gas, which leaks through the joint portion, is trapped at the joint portion between the metal nozzle 1 and the plastic liner layer 2, the plastic liner layer 2 may be deformed and damaged when the internal pressure of the container decreases.

The nozzle of the high-pressure composite material container may have a large size and a complicated structure, and hydrogen storage density of the container is decreased because of the increased weight of the container and a reduced internal volume.

Japanese Patent Application No. 2012-231928 discloses a plastic liner layer coupled directly to a valve coupled to a container inlet so as to maintain gastightness, but while the gastightness between the plastic liner layer and a metal boss may be maintained to some extent by internal pressure of the container when the internal pressure is high, when the internal pressure of the container decreases due to consumption of gas, sufficient gastightness is difficult to ensure only by close contact between the liner layer and the boss. Furthermore, the gastightness is difficult to ensure because of deformation in shape of the plastic liner layer caused when the valve is repeatedly fastened and separated.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art and to provide a high-pressure composite container capable of ensuring gastightness between a metal nozzle and a plastic liner layer.

In one aspect, the present disclosure provides a high-pressure composite container having a gastight nozzle structure including: a metal nozzle which is formed at an inlet of a plastic liner layer that defines an inner layer of the high-pressure composite container; a nozzle insert inserted into and attached to the metal nozzle in a direction from an inner side to an outer side of the plastic liner layer; and a nut member which is fixed to an upper end portion of the nozzle insert.

In an exemplary embodiment, at least one sealing element for maintaining gastightness may be disposed between the nozzle insert and the plastic liner layer.

In another exemplary embodiment, the nozzle insert may have a lower flat plate portion which is formed at a lower end portion of the nozzle insert and in contact with an inner surface of the plastic liner layer, and a first sealing element, which is in contact with the nozzle insert and the plastic liner layer, may be disposed in a groove portion formed in an upper end surface of the lower flat plate portion.

In still another exemplary embodiment, a second sealing element, which is in contact with the nozzle insert and the plastic liner layer, may be disposed between an outer surface of the nozzle insert and an inlet inner surface of the plastic liner layer.

In yet another exemplary embodiment, a third sealing element, which is in contact with the nozzle insert and the plastic liner layer, may be attached to an edge portion of an upper end surface of the lower flat plate portion, a stepped portion in the form of a raised portion may be formed at the edge portion of the upper end surface of the lower flat plate portion, and the third sealing element, which is in contact with the nozzle insert and the plastic liner layer, may be attached to the stepped portion.

In still yet another exemplary embodiment, a fourth sealing element, which is in contact with the upper end surface of the lower flat plate portion and the inner surface of the plastic liner layer, may extend up to a portion between an outer surface of the nozzle insert and an inner surface of the metal nozzle and be in contact with the outer surface of the nozzle insert and the inner surface of the metal nozzle.

In a further exemplary embodiment, the lower flat plate portion may be press-fitted into a groove portion formed in an inner surface of the plastic liner layer, the nozzle insert may have screw threads exposed to the outside of the metal nozzle, a nut member may be fastened to the screw threads, such that one surface of the nut member comes into surface contact with an upper end surface of the metal nozzle, and an elastic member, which elastically supports the metal nozzle toward the plastic liner layer, may be inserted between the metal nozzle and the nut member.

The high-pressure composite container according to the present disclosure may structurally ensure gastightness between the metal nozzle and the plastic liner layer, and if gas leaks, the gas leakage is guided to an interface between the nozzle insert and the metal nozzle instead of an interface between the metal nozzle and the plastic liner layer, and as a result, it is possible to clearly determine whether gas leaks and prevent damage to the plastic liner layer.

The high-pressure composite container according to the present disclosure may be implemented to have a nozzle unit, which has a small and simple structure compared to the related art, and as a result, a weight of the container is reduced and an internal volume is increased, thereby improving hydrogen storage density of the container.

Other aspects and exemplary embodiments in the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuel derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment in the present disclosure will be described in detail with reference to the accompanying drawings.

Figure 1:
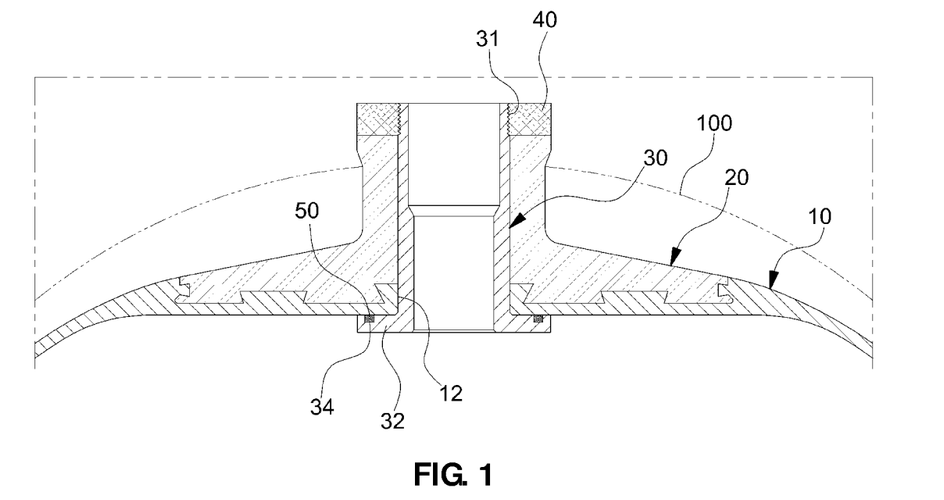
FIG. 1 is a view illustrating a high-pressure composite container according to an exemplary embodiment in the present disclosure.
Figure 2:
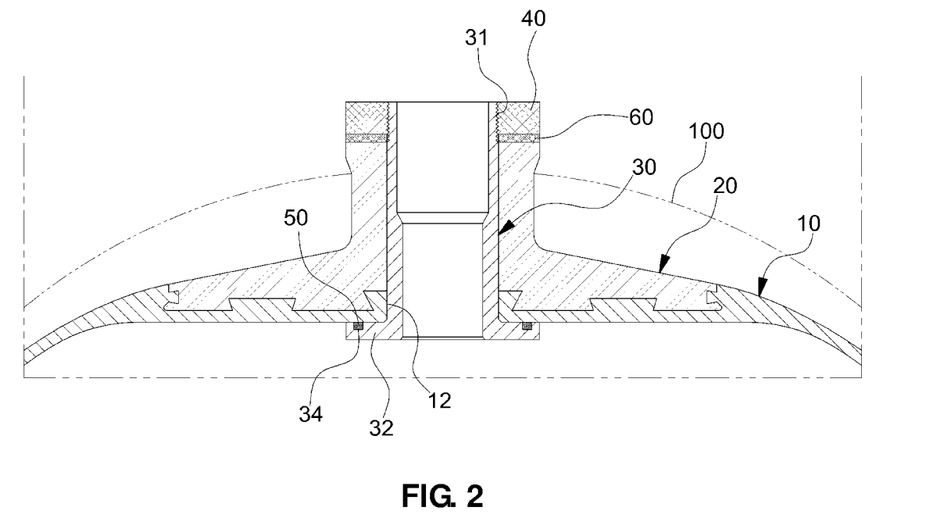
FIG. 2 is a view illustrating a high-pressure composite container according to another exemplary embodiment in the present disclosure.

FIGS. 1 and 2 illustrate a high-pressure composite container according to an exemplary embodiment in the present disclosure, and it is noted that a composite layer 100 is formed outside (or on an outer layer) of a plastic liner layer 10.

As illustrated in FIGS. 1 and 2, the high-pressure composite container according to the present exemplary embodiment has a metal nozzle 20 which is integrally formed at a side of an inlet 12 of the plastic liner layer 10 that defines an inner layer of the high-pressure composite container.

The plastic liner layer 10 is formed by inserting and then injection molding the metal nozzle 20, such that the metal nozzle 20 is integrally formed outside the inlet 12 of the plastic liner layer 10.

A nozzle insert 30, which is inserted into and closely attached to an inner circumferential surface of the metal nozzle 20, is configured in a direction from an inner side to an outer side of the plastic liner layer 10, and a nut member 40 is fixedly assembled to an outer circumferential surface of an upper end portion of the nozzle insert 30 which protrudes upward from the metal nozzle 20.

Specifically, the nozzle insert 30 has screw threads 31 exposed to the outside of the metal nozzle 20, and the nut member 40 is fastened to the screw threads 31, such that one surface of the nut member 40 comes into close surface contact with an upper end surface of the metal nozzle 20 in a gastight manner. That is, the nut member 40 is closely stacked on the upper end surface of the metal nozzle 20 by being in surface contact with the upper end surface of the metal nozzle 20.

A lower flat plate portion 32, which is closely attached to an inner circumferential surface of the plastic liner layer 10 by being in surface contact with the inner circumferential surface of the plastic liner layer 10, is formed to extend from a lower end portion of the nozzle insert 30, and a first sealing element 50 is assembled to a groove portion 34 formed in an upper end surface of the lower flat plate portion 32.

The first sealing element 50 is configured to be in surface contact with the lower flat plate portion 32 of the nozzle insert 30 and the plastic liner layer 10, thereby stably maintaining gastightness between the nozzle insert 30 and the plastic liner layer 10.

The metal nozzle supports the periphery of the inlet 12 of the plastic liner layer 10 with which the first sealing element 50 is in surface contact, and as a result, sufficient compression may be formed between the plastic liner layer 10 and the first sealing element 50, thereby maintaining gastightness.

In addition, to improve gastightness performance when internal pressure of the high-pressure composite container is low, an elastic member 60 such as a spring washer or a flat spring may be inserted between the metal nozzle 20 and the nut member 40 as illustrated in FIG. 2.

The elastic member 60 serves to elastically support the metal nozzle 20 toward the plastic liner layer 10, and thus compressing force between the nozzle insert 30 and the plastic liner layer 10 may be increased, and as a result, gastightness may be improved in a state in which pressure is low.

Figure 3:
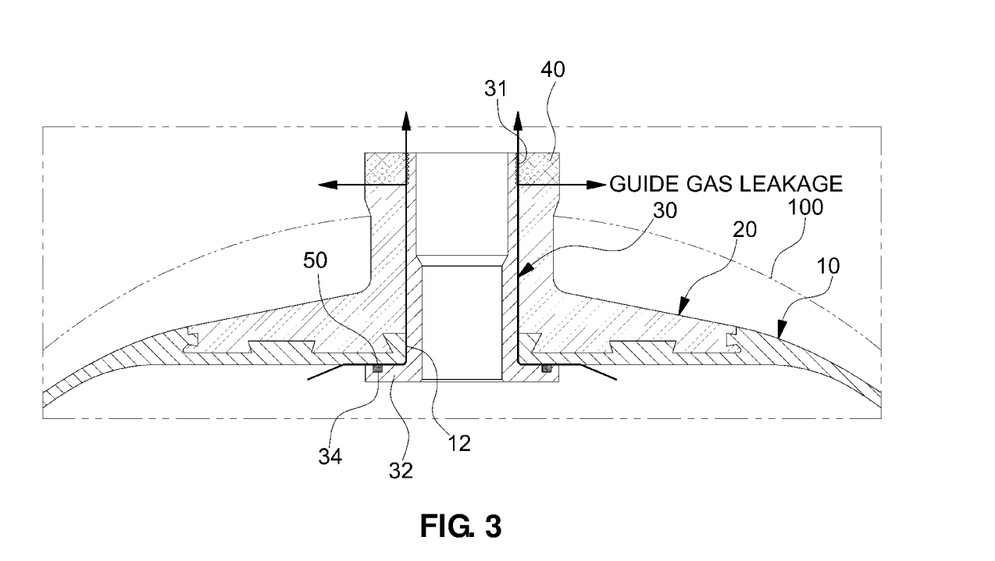
FIG. 3 is a view illustrating gas flow paths when gas leaks from the high-pressure composite container according to another exemplary embodiment in the present disclosure.

If gas leaks from the high-pressure composite container having the aforementioned structure, the gas leakage is guided to an interface between the nozzle insert 30 and the metal nozzle 20 instead of an interface between the metal nozzle 20 and the plastic liner layer 10 (see FIG. 3).

Although not illustrated in the drawings, the gas leakage may be guided to a position where the gas leakage is easily measured by forming fine flow paths, surface unevenness, or the like on an outer circumferential surface of the nozzle insert 30 or an outer circumferential surface of the metal nozzle 20.

The high-pressure composite container having the aforementioned structure may be applied to a fuel tank for a fuel cell vehicle, and the like.

In another exemplary embodiment in the present disclosure, a high-pressure composite container, which has a structure capable of ensuring gastightness performance at a level identical to that of the high-pressure composite container described above, will be described with reference to FIGS. 4 to 8.

Figure 4:
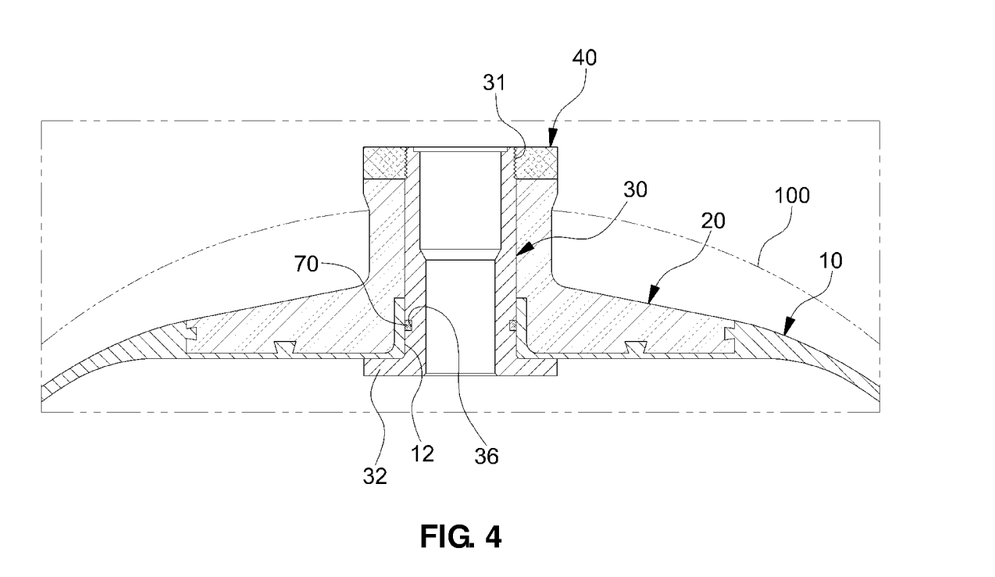
FIGS. 4 to 8 are views illustrating a high-pressure composite container according to yet another exemplary embodiment of the present disclosure.
Figure 5:
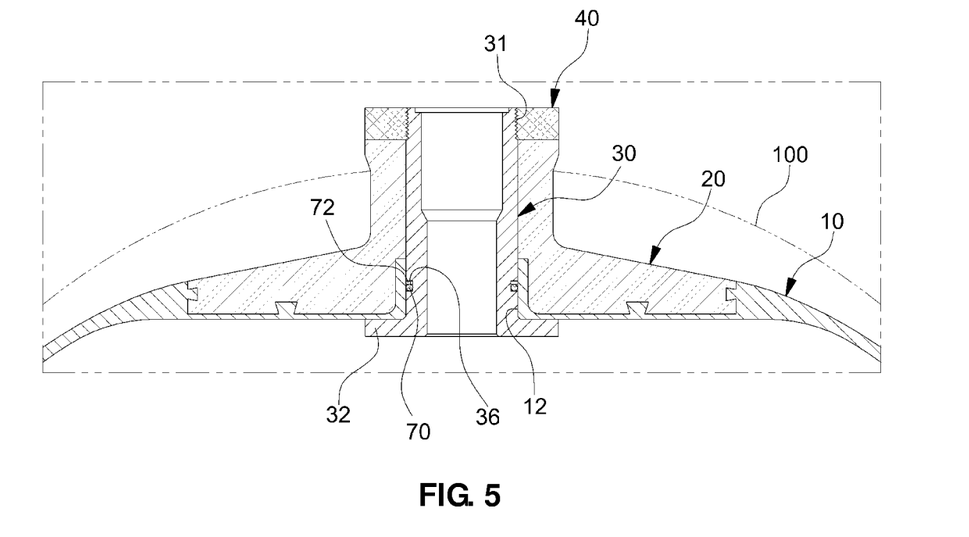

Referring to FIGS. 4 and 5, a second sealing element 70, which is a sealing element for maintaining gastightness between the plastic liner layer 10 and the nozzle insert 30, is disposed between the outer circumferential surface of the nozzle insert 30 and the inner circumferential surface of the inlet 12 of the plastic liner layer 10.

The second sealing element 70 is disposed in a groove portion 36 formed in the outer circumferential surface of the nozzle insert 30, and maintains gastightness by being closely attached to and in surface contact with the outer circumferential surface of the nozzle insert 30 and the inner circumferential surface of the inlet 12 of the plastic liner layer 10.

The second sealing element 70 may be configured as an O-ring which is made of a plastic material and press-fitted into the groove portion 36 of the nozzle insert 30 (see FIG. 4), or configured as an O-ring which is made of a rubber material and inserted into the groove portion 36 of the nozzle insert 30 (see FIG. 5), and in this case, a back-up ring 72 for preventing withdrawal of the O-ring made of a rubber material is assembled to the groove portion 36 in a state in which the back-up ring 72, together with the O-ring, is inserted into the groove portion 36.

Figure 6:
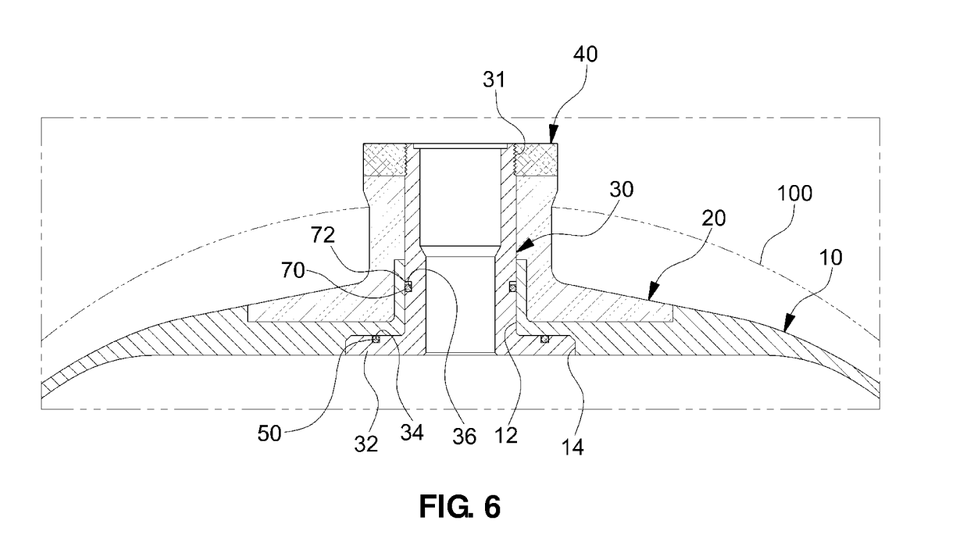

As illustrated in FIG. 6, the second sealing element 70 may be used together with the aforementioned first sealing element 50 in order to enhance gastightness, and a third sealing element 80 to be described below may be also be used together with the first sealing element 50.

That is, the sealing structures for maintaining gastightness are together applied between the outer circumferential surface of the nozzle insert 30 and the upper end surface of the lower flat plate portion 32, and as a result, it is possible to further improve gastightness between the nozzle insert 30 and the plastic liner layer 10.

Figure 7:
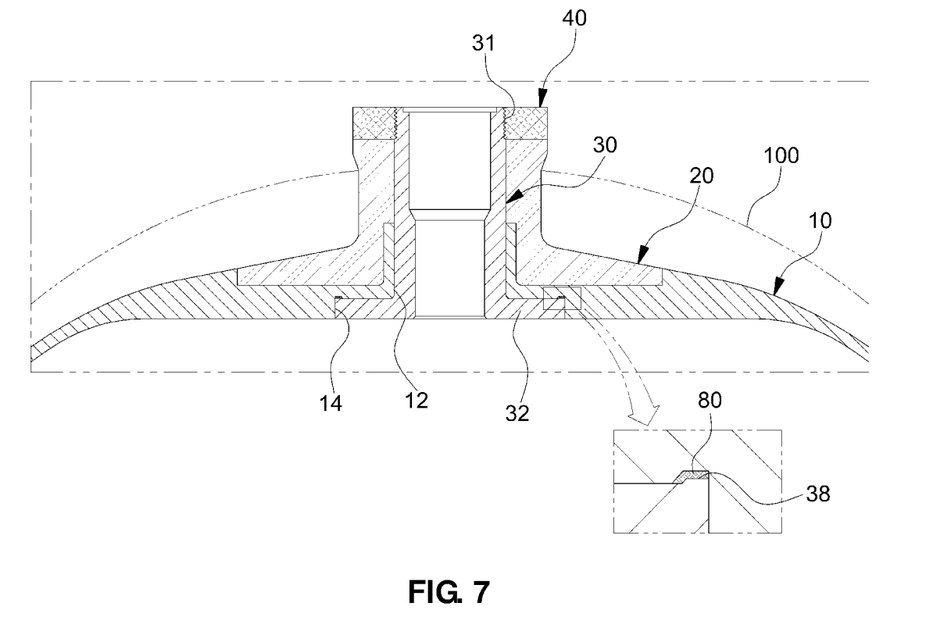

Next, referring to FIG. 7, as a sealing element for maintaining the gastight seal between the nozzle insert 30 and the plastic liner layer 10, the third sealing element 80, which is formed as a gasket made of a rubber material, is disposed at an edge portion of the upper end surface of the lower flat plate portion 32.

The third sealing element 80 maintains gastightness by being closely attached to and in surface contact with the upper end surface of the lower flat plate portion 32 and the inner circumferential surface of the plastic liner layer 10.

In this case, to enhance gastightness, a stepped portion 38 in the form of a raised portion is formed at an edge portion of the upper end surface of the lower flat plate portion 32, and the third sealing element 80 is attached to the stepped portion 38 in a gastight manner.

A groove portion 14 into which the lower flat plate portion 32 is inserted (or press-fitted) in a gastight manner is formed in the inner circumferential surface of the plastic liner layer 10, and a gastight seal between the nozzle insert 30 and the plastic liner layer 10 is maintained by the third sealing element 80 which is attached to an edge portion of the lower flat plate portion 32 and assembled to the groove portion 14.

In this case, the groove portion 14 is formed adjacent to the inlet 12 of the plastic liner layer 10.

Figure 8:
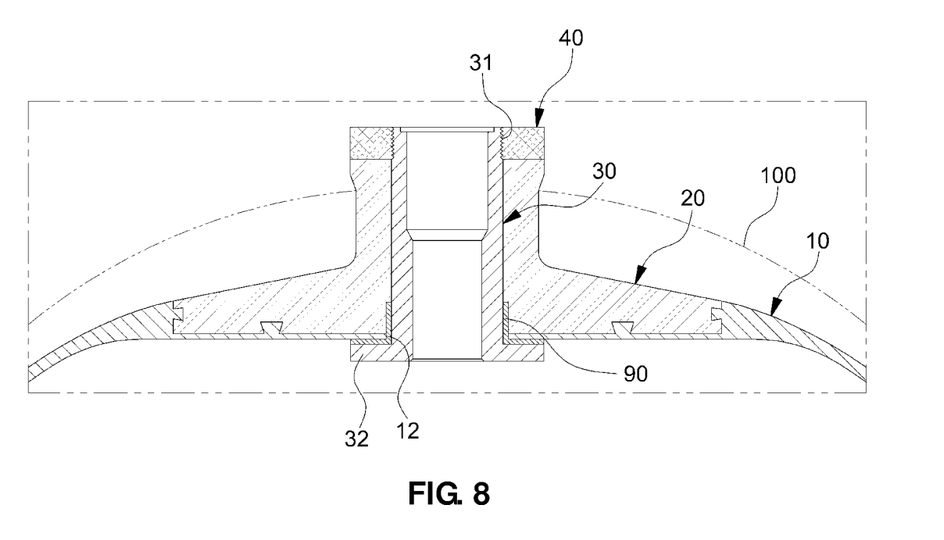

Next, referring to FIG. 8, as a sealing element for maintaining the gastight seal between the nozzle insert 30 and the plastic liner layer 10, a fourth sealing element 90, which is in surface contact with the upper end surface of the lower flat plate portion 32 and the inner circumferential surface of the plastic liner layer 10, extends up to a portion between the outer circumferential surface of the nozzle insert 30 and the inner circumferential surface of the metal nozzle 20 and is in surface contact with the outer circumferential surface of the nozzle insert 30 and the inner circumferential surface of the metal nozzle 20.

The fourth sealing element 90 is formed as a gasket made of a rubber material, has a structure which may be closely attached to the upper end surface of the lower flat plate portion 32 and the outer circumferential surface of the nozzle insert 30, and as a result, the fourth sealing element 90 maintains gastightness by simultaneously being in contact with the plastic liner layer 10 and the metal nozzle 20.

The present disclosure has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A high-pressure composite container having a gastight nozzle structure, the high-pressure composite container comprising:
 a metal nozzle formed at a side of an inlet of a plastic liner layer that defines an inner layer of the high-pressure composite container;
 a nozzle insert which is inserted into and attached to the metal nozzle in a direction from an inner side of the plastic liner layer to an outer side of the plastic liner layer; and
 a nut member fixed to an upper end portion of the nozzle insert, wherein an elastic member elastically supports the metal nozzle toward the plastic liner layer and is disposed between the metal nozzle and the nut member, wherein the nozzle insert has screw threads exposed to an outside of the metal nozzle, and the nut member is fastened to the screw threads, wherein the nozzle insert has a lower flat plate portion disposed at a lower end portion of the nozzle insert and in contact with an inner surface of the plastic liner layer, wherein the lower flat plate portion is press-fitted into a groove portion defined in the inner surface of the plastic liner layer, wherein a third sealing element is in contact with the nozzle insert and the inner surface of the plastic liner layer and is attached to an edge portion of an upper end surface of the lower flat plate portion, and wherein the nozzle insert includes a stepped portion protruding from the edge portion of the upper end surface of the lower flat plate portion, and the third sealing element is attached to the stepped portion.

2. The high-pressure composite container of claim 1, wherein at least one sealing element for maintaining gastightness is disposed between the nozzle insert and the plastic liner layer.

3. The high-pressure composite container of claim 1, wherein a first sealing element is in contact with the nozzle insert and the plastic liner layer and is disposed in a groove portion formed in an upper end surface of the lower flat plate portion.

4. The high-pressure composite container of claim 1, wherein a fourth sealing element is in contact with an upper end surface of the lower flat plate portion and the inner surface of the plastic liner layer, extends up to a portion between an outer surface of the nozzle insert and an inner surface of the metal nozzle and is in contact with the outer surface of the nozzle insert and the inner surface of the metal nozzle.

5. The high-pressure composite container of claim 1, wherein a second sealing element is in contact with the nozzle insert and the plastic liner layer and is disposed between an outer surface of the nozzle insert and an inlet inner surface of the plastic liner layer.

6. The high-pressure composite container of claim 1, wherein the elastic member is arranged between the metal nozzle and the nut member in an axial direction of the nozzle insert.

* * * * *